United States Patent [19]
Inoue et al.

[11] Patent Number: 5,239,254
[45] Date of Patent: Aug. 24, 1993

[54] SERIES-EXCITING DEVICE FOR SYNCHRONOUS GENERATORS

[75] Inventors: Kenji Inoue; Takayuki Fujikawa, both of Hiroshima, Japan

[73] Assignee: Shindaiwa Kogyo Company Ltd., Hiroshima, Japan

[21] Appl. No.: 857,422

[22] Filed: Mar. 26, 1992

[51] Int. Cl.$^5$ .................................... H02P 9/10
[52] U.S. Cl. ........................................ 322/86; 322/87
[58] Field of Search ....................... 322/86, 87, 88

[56] References Cited

U.S. PATENT DOCUMENTS

| | | | |
|---|---|---|---|
| 2,911,584 | 11/1959 | Kall | 322/86 X |
| 2,927,263 | 3/1960 | Kall | 322/86 X |
| 3,771,046 | 11/1973 | Harter | 322/88 X |
| 4,035,714 | 7/1977 | Sato | 322/86 X |
| 4,143,280 | 3/1979 | Kuehn, Jr. et al. | 322/88 X |

Primary Examiner—R. J. Hickey
Attorney, Agent, or Firm—Longacre & White

[57] ABSTRACT

A series-exciting device for a synchronous generator characterized in that armature windings at the side of the armature are wound using concentrated full-pitch winding or a winding method similar to the concentrated full-pitch winding; an exciting winding which is magnetically coupled to magnetic poles in a quantity odd times greater than the quantity of the poles of the said armature windings, and a rectifier which converts the electromotive force of the exciting winding into a DC are provided at the side of the field system; and a DC output terminal of the rectifier is connected to a field winding having poles in the same quantity as the quantity of the poles of the said armature windings.

3 Claims, 4 Drawing Sheets

LOAD CHARACTERISTIC

OUTPUT VOLTAGE WAVEFORM
(COS φ = 1.0)

SERIES-EXCITING DEVICE FOR SYNCHRONOUS GENERATORS

BACKGROUND OF THE INVENTION

1. Field of the Invention

The present invention relates to a series-exciting device for synchronous generators which compensates for a decrease in the output voltage due to a load current.

2. Description of the Related Arts

An exciting current transformer or an automatic voltage regulator has been used as a series-exciting device for a synchronous generator.

However, the above devices require not only a high cost but also a large space for installation. Further, since electrical wires are routed via these devices, there has been a problem that the wiring is complicated.

SUMMARY OF THE INVENTION

It is an object of the present invention to provide a series-exciting device which solves the above-mentioned problems, wherein armature windings at the side of the armature are wound using concentrated full-pitch winding or a winding method similar to the concentrated full-pitch winding; an exciting winding which is magnetically coupled with magnetic poles in a quantity odd times greater than the quantity of the poles of the armature winding and a rectifier which converts the electromotive force of the exciting winding into a DC, are provided at the side of the field system; and a DC output terminal of the rectifier is connected to a field winding having poles in the same quantity as that of the poles of the armature windings.

When an AC load current flows through the armature windings which have been wound using the concentrated full-pitch winding or a winding method similar to the concentrated full-pitch winding, an armature reaction field resulting from the load current comprises, odd spatial harmonic fields in addition to a fundamental wave magnetic field. The odd spatial harmonic fields serve as a rotating magnetic field to induce an electromotive force at the exciting winding at the side of the field coupled thereto magnetically. The electromotive force is converted into a DC by the rectifier, and a DC magnetic field current flows through the field system winding to enhance the main magnetic field. As a result, the decrease in the output voltage due to the load current is compensated to keep the output voltage of the generator constant.

DETAILED DESCRIPTION OF THE PREFERRED EMBODIMENT

As a first embodiment, a series-exciting device for a two-pole three-phase rotating field type synchronous generator with brushes will be described with reference to FIG. 1–FIG. 3.

Figure 1:
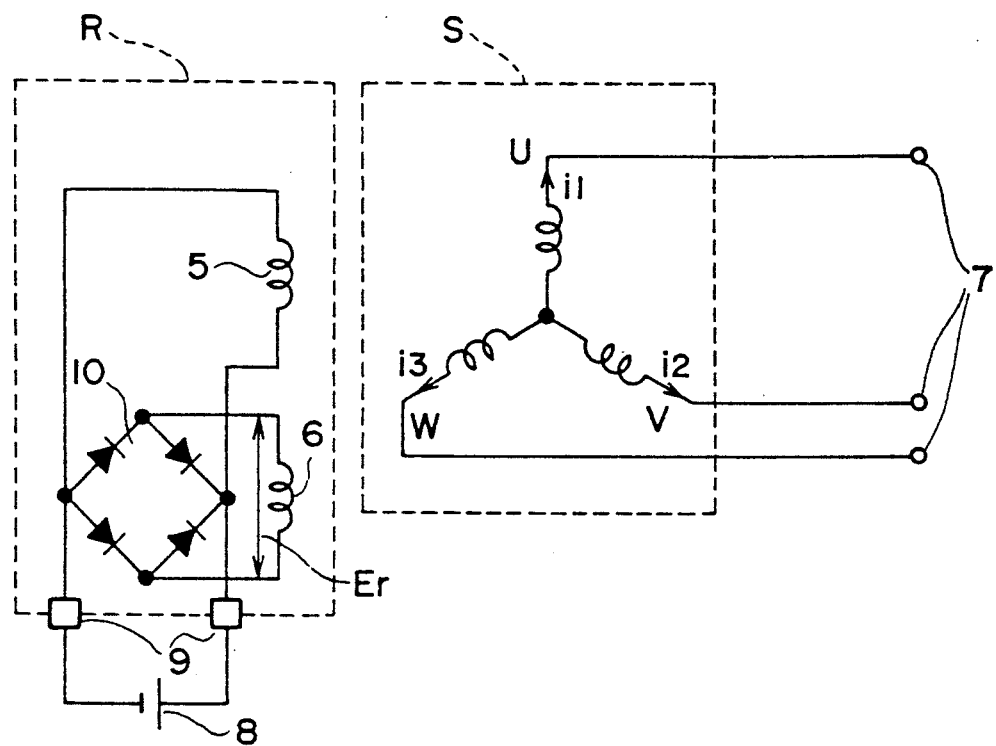
FIG. 1 is the circuit diagram of a rotating field type synchronous generator with brushes according to the present invention.

In FIG. 1, S represents an armature; R represents a rotor; and U, V, and W represent three-phase armature windings. As shown in FIG. 2, the armature windings U, V, and W are wound using 2-pole three-phase concentrated full-pitch winding. The armature windings U, V, and W are star-connected as shown in FIG. 1, each phase being connected to the load via an output terminal 7.

Figure 2:
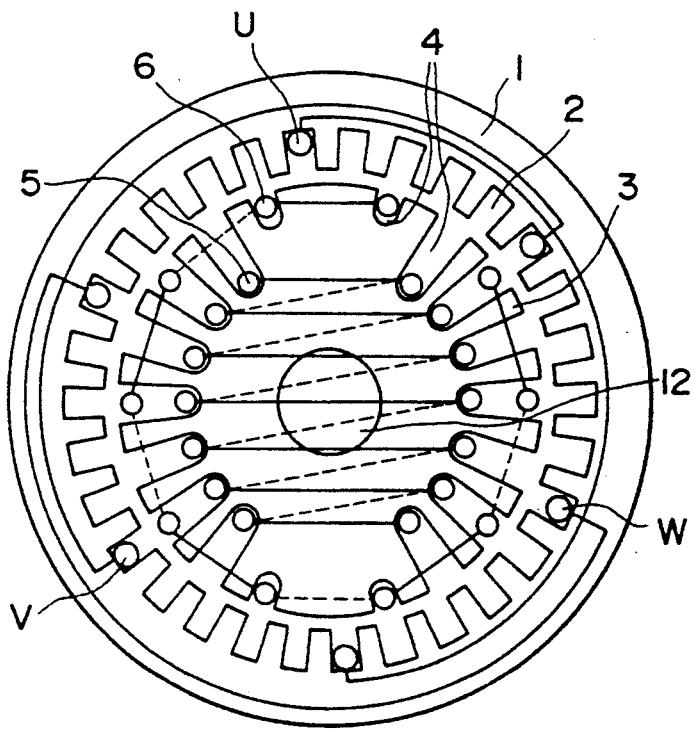
FIG. 2 illustrates sections of major parts of the stator and rotor in FIG. 1 and the wiring method thereof.

On the other hand, at the side of the rotor R, a field winding 5 and an exciting winding 6 are wound inside a rotor slot 4 of a rotor core 3 as shown in FIG. 2. The field winding 5 is wound so that it has two poles, i.e., the same quantity of poles as those for the armature windings U, V, and W. The exciting winding 6 is wound so that it has ten poles to be magnetically coupled with magnetic poles five times (odd times) larger in quantity than the poles of the armature windings U, V, and W. The field winding 5 is connected to the exciting winding 6 via the rectifier 10. The rectifier 10 is attached to a rotor shaft 12 and rotates with the rotor core 3. 8 represents an exciting power source connected to the field system winding 5 via a slip ring 9.

The operation will now be described.

When a field system current is supplied from the exciting power source 8 to the field system 5 to rotate the rotor R in a no-load state, a no-load armature terminal voltage is established.

When three-phase balanced loads are then connected to the output terminal 7, three-phase load currents i1, i2, and i3 flow through the armature windings U, V, and W, generating an armature reaction field. Since the armature windings U, V, and W are concentrated-full-pitch-wound, the armature reaction field includes odd spatial harmonic fields in addition to a fundamental field. This will now be analytically described.

Figure 3:
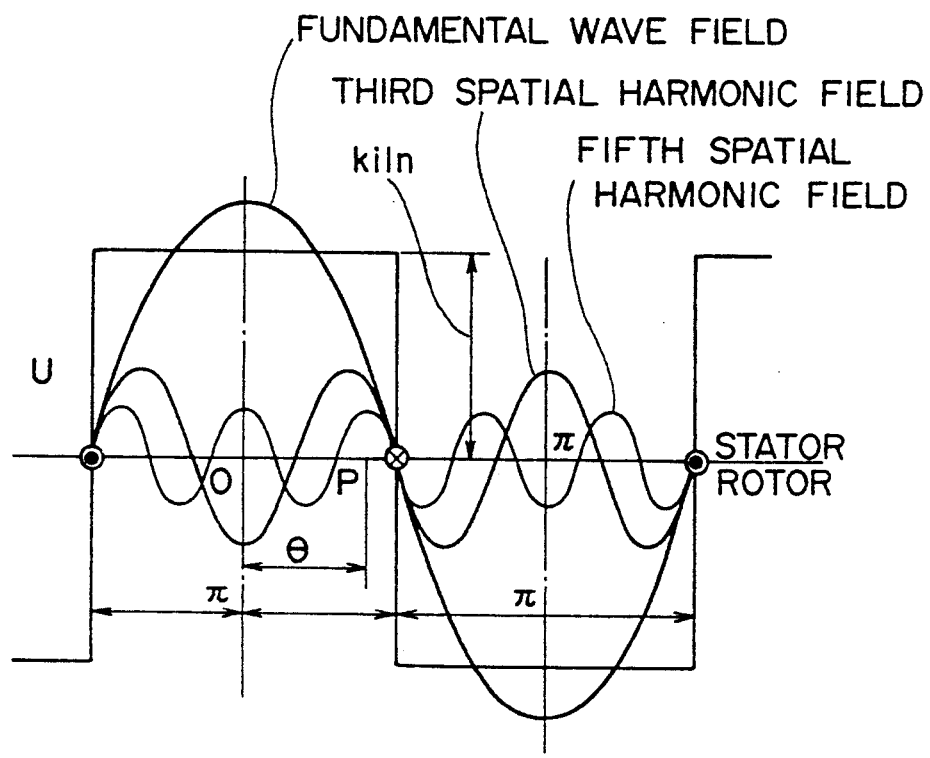
FIG. 3 shows the distribution of a rectangular wave field represented by Fourier series for the U-phase of the armature windings in FIG. 1.

The distribution of the field resulting from the current flow through the concentrated-full-pitch-wound armature winding U appears as a rectangular wave having an amplitude of $ki_1n(AT/m)$ as shown in FIG. 3 where n(T) represents the winding of the armature winding U; i1(A) represents the load current flowing through the armature winding U; and k represents a proportional constant.

The strength H1 of the field at an arbitrary point P at a distance of an electrical angle $\theta$ (rad) from a 0 point which is the central point 0 of the rectangular wave serving as a base point, is expressed as Fourier series as follows.

$$H_1 = \frac{4ki_1n}{\pi}\left(\cos\theta - \frac{1}{3}\cos 3\theta + \frac{1}{5}\cos 5\theta - \frac{1}{7}\cos 7\theta + \ldots\right) \quad (1)$$

when a load current $i_1 = \sqrt{2I}\sin\omega t(A)$ is substituted, $$H_1 = \quad (2)$$

$$Hm\sin\omega t \left( \cos\theta - \frac{1}{3}\cos 3\theta + \frac{1}{5}\cos 5\theta - \frac{1}{7}\cos 7\theta + \ldots \right)$$

where $$Hm = \frac{4}{\pi} \sqrt{2}\, kIn$$

It will be understood that the field H1 is constituted by the fundamental wave field $Hm \sin \omega t \cos \theta$ which is the first term, and odd spatial harmonic fields such as the third spatial harmonic magnetic field which is the second term and the fifth spatial harmonic field.

Next, when three-phase load currents:

$$i_1 = \sqrt{2}\, I\sin\omega t \quad (U)$$

$$i_2 = \sqrt{2}\, I\sin\left(\omega t - \frac{2}{3}\pi\right) \quad (V)$$

$$i_3 = \sqrt{2}\, I\sin\left(\omega t - \frac{4}{3}\pi\right) \quad (W)$$

flow through the concentrated-full-pitch-wound armature windings U, V, and W wound around the armature S at positions which are shifted by $2\pi/3$(rad) each, the strengths Hu, Hv, and Hw of the fields resulting from the respective currents are:

$$Hu = Hm\sin\omega t \left( \cos\theta - \frac{1}{3}\cos 3\theta + \frac{1}{5}\cos 5\theta - \ldots \right)$$

$$Hv = Hm\sin\left(\omega t - \frac{2\pi}{3}\right)\left\{ \cos\left(\theta - \frac{2\pi}{3}\right) - \frac{1}{3}\cos 3\left(\theta - \frac{2\pi}{3}\right) + \frac{1}{5}\cos 5\left(\theta - \frac{2\pi}{3}\right) \ldots \right\}$$

$$Hw = H\sin\left(\omega t - \frac{4\pi}{3}\right)\left\{ \cos\left(\theta - \frac{4\pi}{3}\right) - \frac{1}{3}\cos 3\left(\theta - \frac{4\pi}{3}\right) + \frac{1}{5}\cos 5\left(\theta - \frac{4\pi}{3}\right) \ldots \right\}$$

$$(3)$$

Therefore, a synthetic field H3 resulting from the three-phase load currents i1, i2, and i3 is the synthesis of the Hu, Hv, and Hw in the equations 3, and the following equation is derived.

$$H_3 = Hu + Hv + Hw \quad (4)$$

$$= \frac{3}{2} Hm \left\{ \sin(\omega t - \theta) + \frac{1}{5}\sin(\omega t + 5\theta) - \frac{1}{7}\sin(\omega t - 7\theta) + \ldots \right\}$$

The equation 4 indicates that the field H3, i.e., the armature reaction field resulting from the three-phase load currents i1, i2, and i3 is constituted a fundamental wave field $3/2Hm \sin(\omega t - \theta)$ which is the first term and odd spatial harmonic fields such as the fifth spatial harmonic field which is the second term and the seventh spatial harmonic field which is the third term, and that, from the signs of the phase angles, the fifth and seventh spatial harmonic fields rotate in the opposite and same directions, respectively, with respect to the fundamental wave field.

The present invention actively utilizes the odd spatial harmonic fields derived from the above results of analysis and, a first embodiment has a configuration wherein the fifth spatial harmonic fields (ten poles) are utilized.

Specifically, since the fifth spatial harmonic field and the exciting winding 6 are magnetically coupled, an electromotive force Er is induced at the exciting winding 6 when the fifth spatial harmonic field is cut by the exciting winding 6. The electromotive force Er is converted by the rectifier 10 into a DC to cause a field current to flow through the field winding 5. The field current resulting from the electromotive force Er is added to the field current that has been supplied from the exciting power source 8 at no load, whereby the main magnetic field is enhanced and the decrease in the output voltage due to the load current is compensated.

Since the strength of the fifth spatial harmonic field is proportional to the amplitude of the load current, the field current increases or decreases as the load current increases or decreases, suppressing fluctuation in the output voltage.

As described above, by adding of the series excitation according to the present invention to the shunt excitation using the exciting power source 8, a constant voltage characteristic required for a synchronous generator can be obtained.

Next, a series-exciting device for a brushless self-excited three-phase synchronous generator will now be described as a second embodiment.

Figure 4:
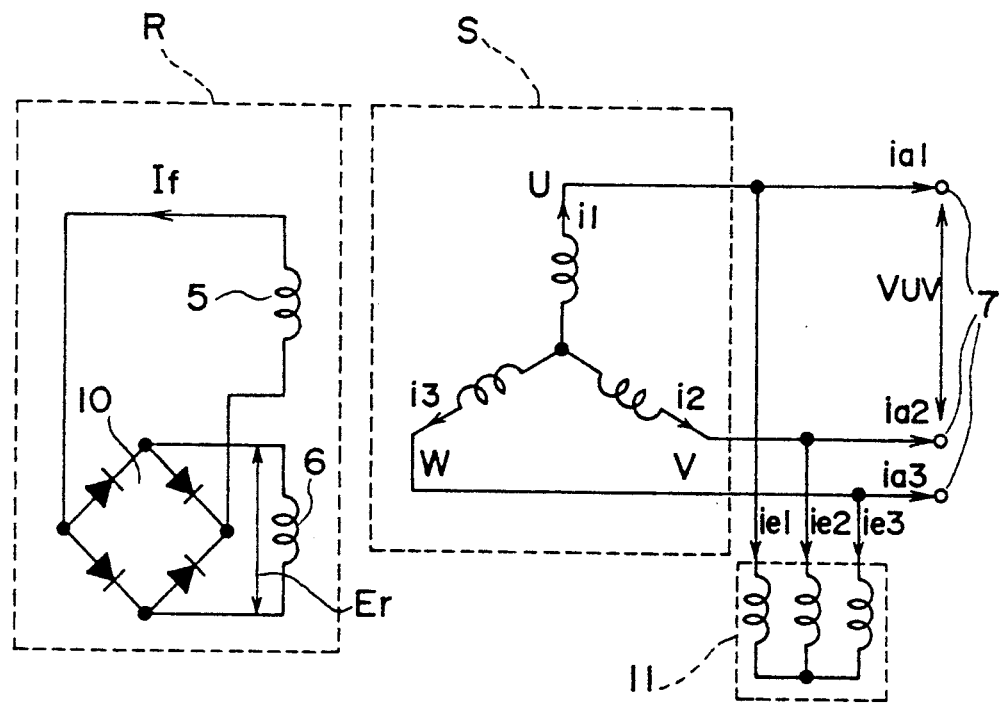
FIG. 4 is the circuit diagram of a second embodiment of a brushless rotating field type synchronous generator according to the present invention.

FIG. 4 shows the electrical circuit of the second embodiment.

It differs from the first embodiment in that the exciting power source 8 and the slip ring 9 in FIG. 1 are eliminated and a reactor 11 is connected to the armature winding in parallel with a load. The method of the winding of the armature windings U, V, and W and the exciting winding is the same as that for the first embodiment.

The operation of the second embodiment will now be described.

When the rotor R is rotated in a no-load state, a residual field at the rotor core 3 (main field) induces a slight electromotive force at the armature windings U, V, and W, causing currents i1, i2, and i3 (=ie1, ie2, and ie3: reactor currents) to flow through the armature windings U, V, and W, respectively, through the reactor 11. The fifth spatial harmonic field resulting from the current induces an electromotive force Er at the exciting winding 6 which is magnetically coupled thereto. The electromotive force Er is converted into a DC by the rectifier 10 to cause a field current If to flow through the field winding 5, enhancing the main field. Such a self-exciting action establishes a no-load armature terminal voltage.

Next, when three-phase balanced loads are connected to the output terminal 7, synthetic currents i1(=ie1+ia1), i2 (ie2+ia2), and i3(=ie3+ia3) resulting from the reactor currents ie1, ie2, and ie3 and load currents ia1, ia2, and ia3 flow through the armature windings U, V, and W, enhancing the fifth spatial harmonic field. As a result, the field current If is enhanced; the decrease in the voltage due to the load currents is compensated; and an output voltage Vuv is kept at a constant value.

Figure 5:
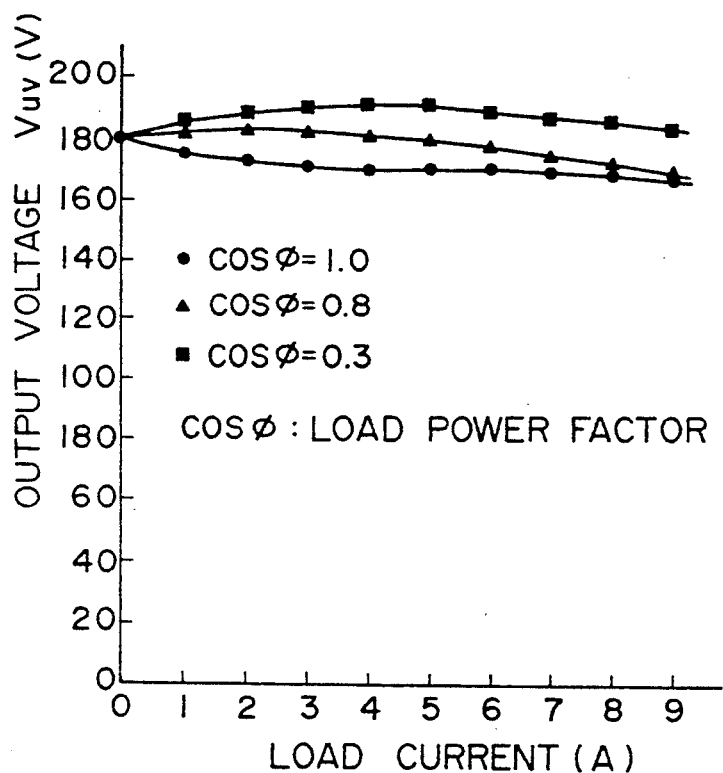
FIG. 5 shows the load characteristics in a case wherein balanced three-phase loads having different power factors are connected in FIG. 4.
Figure 6:
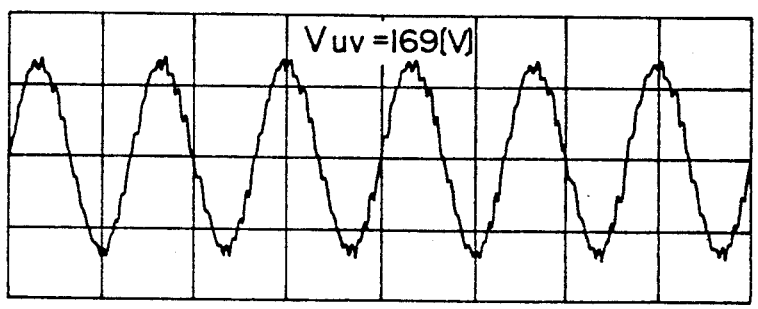
FIG. 6 shows the waveform of the output voltage in FIG. 5.

FIG. 5 and FIG. 6 show the load characteristics and output voltage waveform obtained from an experiment wherein balanced three-phase loads having different power factors were connected to the brushless self-excited three-phase synchronous generator which is the second embodiment.

The effect of the series-exciting device according to the present invention suppresses the fluctuation in the output voltage relative to changes in the load current and the load power factors. Further, the output voltage wave-form is substantially a sine wave, which proves the high usefullness of the present invention.

Although the above two embodiments have been described on the assumption that the armature windings U, V, and W are concentrated-full-pitch-wound, the method of the winding of the armature windings U, V, and W is not limited thereto.

That is, while the concentrated full-pitch winding is ideal for the formation of the odd spatial harmonic fields in the armature reaction field, other winding methods similar to the concentrated full-pitch winding may be employed.

The winding methods similar to the concentrated full-pitch winding include any winding method wherein the winding coefficient for armature windings is appropriately selected in order to positively form odd spatial harmonic fields in the armature reaction field.

Figure 7:
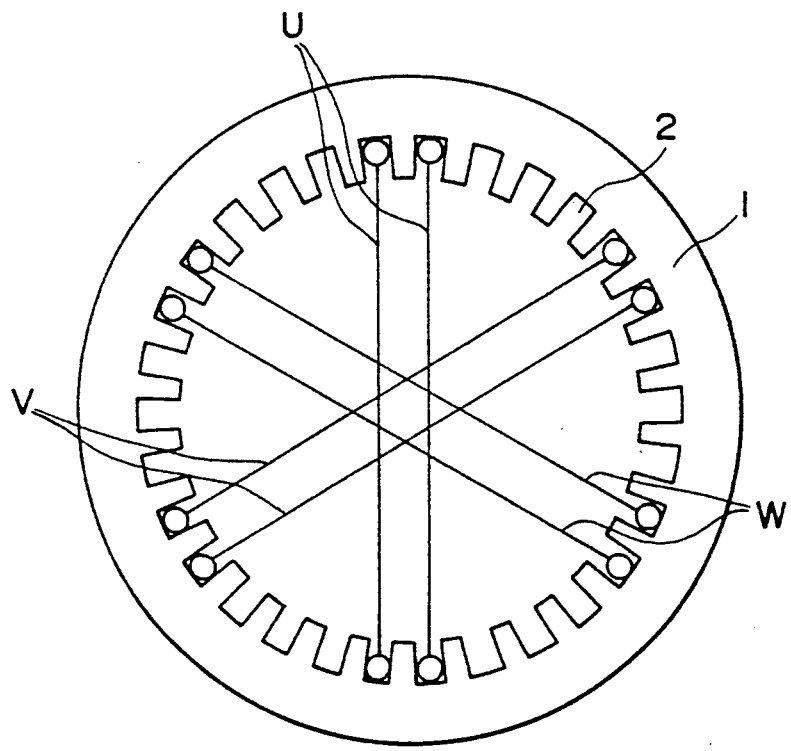
FIG. 7 shows another embodiment of the winding of U, V, and W windings according to the present invention.

For example, FIG. 7 shows another embodiment of the method of winding the armature windings U, V, and W in accordance with the present invention, which employs distributed full-pitch winding wherein they are distributed between two adjacent armature slots.

While the odd spatial harmonic fields become weaker when each of the armature windings U, V, and W are widely distributed, the embodiment shown in FIG. 7 indicates that the distributed winding may be employed with the strength of the odd spatial harmonic fields is selected within a practical range.

Although the embodiments of the present invention have been described with reference to a synchronous generator of a rotating field system type, the series-exciting device according to the present invention may be used for a synchronous generator of a rotating armature type.

Further, although the exciting winding 6 has ten poles in the above two embodiments, the method of winding of the exciting winding 6 is not limited to the above-described embodiments as long as the magnetic coupling to the odd harmonic fields is made.

Moreover, as will be understood from the second embodiment, it is possible to add the function of the exciting power source 8 in the first embodiment, i.e., the shunt excitation.

As described above, since the series-exciting device according to the present invention can be incorporated into the armature and rotor, it is possible to eliminate the need for an exciting current transformer and an AVR which have been conventionally used, thereby simplifying the wiring and reducing the size and cost of a generator.

Further, by adding shunt excitation to the series-exciting device according to the present invention, it is possible to provide a novel brushless self-excited three-phase synchronous generator as described in the second embodiment.

What is claimed is:

1. A series-exciting device for a synchronous generator characterized in that a core of a field system is wound with a field winding and an exciting winding, and a core of an armature is wound with a winding method wherein the winding coefficient for said armature is appropriately selected in order to form odd spacial harmonic fields in an armature reaction field and comprise magnetic poles in a first quantity; wherein said exciting winding is magnetically coupled to magnetic poles in a second quantity selected so as to be odd times greater than the first quantity of the poles of the windings wound on the core of said armature, and a rectifier rectifies an alternating current electromotive force induced at the exciting winding; and a direct current output terminal of the rectifier is connected to said field winding, said field winding having poles in a third quantity equivalent to the first quantity of the poles of said armature windings.

2. The series-exciting device recited in claim 1 wherein said winding method comprises a concentrated full-pitch winding.

3. A series-exciting device for a synchronous generator comprising:
   a core of a field system comprising a field winding and an exciting winding;
   a core of an armature comprising an armature winding wherein a winding coefficient for said armature winding is selected in order to form odd spacial harmonic fields in an armature reaction field, and said armature winding comprises a first quantity of poles;
   a rectifier means for converting an alternating current electromotive force induced at the exciting winding into a direct current; and
   a direct current output terminal of said rectifier means connected to said field winding whereby said direct current flows through said field winding to enhance a main magnetic field;
   wherein said exciting winding is magnetically coupled to magnetic poles in a second quantity which is odd times greater than said first quantity, and said field winding has poles in a third quantity equivalent to said first quantity.

* * * * *